US009001650B2

(12) United States Patent
Takeshima et al.

(10) Patent No.: US 9,001,650 B2
(45) Date of Patent: Apr. 7, 2015

(54) TCP RELAY APPARATUS

(71) Applicant: Hitachi, Ltd., Tokyo (JP)

(72) Inventors: Yoshiteru Takeshima, Tokyo (JP);
Hiraku Kawabe, Saitama (JP);
Masahiko Nakahara, Machida (JP);
Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 262 days.

(21) Appl. No.: 13/746,794

(22) Filed: Jan. 22, 2013

(65) Prior Publication Data

US 2014/0036662 A1 Feb. 6, 2014

(30) Foreign Application Priority Data

Apr. 27, 2012 (JP) ................................ 2012-102038

(51) Int. Cl.
*H04L 12/931* (2013.01)
(52) U.S. Cl.
CPC .................................. *H04L 49/505* (2013.01)
(58) Field of Classification Search
CPC .................................................. H04L 49/505
USPC ....................................................... 370/229
See application file for complete search history.

(56) References Cited

U.S. PATENT DOCUMENTS

| 6,273,622 B1* | 8/2001 | Ben-David ..................... 709/230 |
| 2002/0150048 A1* | 10/2002 | Ha et al. ......................... 370/231 |
| 2003/0099197 A1* | 5/2003 | Yokota et al. .................. 370/230 |
| 2011/0125915 A1 | 5/2011 | Takei et al. | |

* cited by examiner

*Primary Examiner* — Andrew Chriss
*Assistant Examiner* — Voster Preval
(74) *Attorney, Agent, or Firm* — Foley & Lardner LLP

(57) ABSTRACT

An apparatus for terminating and replaying transmission control protocol (TCP) communication between a server and cellular phone is disclosed. The TCP relay apparatus performs precise control for each TCP connection in the process of executing default TCP transmission control for the server and performing wireless-optimized TCP transmission control for the cell phone while facilitating setup for determination of the type of a network to which a communication destination terminal belongs. The TCP relay apparatus includes a unit capable of setting TCP control information suitable for the characteristics of a network linked to the destination device on a per-TCP connection basis, a unit which enables an application program to instruct the TCP control information setting, and a unit which determines the network type by judging whether the connection is a passive connection to a listen port or a TCP connection to the server.

19 Claims, 7 Drawing Sheets

FIG. 2

SOCKET PARAMETER MANAGEMENT TABLE (271)

| SOCKET DESCRIPTOR | TYPE | RTO MIN VALUE | RTO MAX VALUE | INITIAL WINDOW SIZE | ... |
|---|---|---|---|---|---|
| ... | | ... | ... | ... | ... |
| 3 | WIRELESS NETWORK A | 5 SEC. | 60 SEC. | 4 | ... |
| 4 | WIRED NETWORK A | 0.2 SEC. | 120 SEC. | 3 | ... |
| ... | | ... | ... | ... | ... |

CUSTOM TCP SETUP (272)

| TYPE \ ITEM | RTO MIN VALUE | RTO MAX VALUE | INITIAL WINDOW SIZE | ... |
|---|---|---|---|---|
| WIRED NETWORK A | (DEFAULT VALUE) | (DEFAULT VALUE) | (DEFAULT VALUE) | ... |
| WIRELESS NETWORK A | 5 SEC. | 60 SEC. | 4 | ... |
| ... | ... | ... | ... | ... |

2721　2722　2723　2724

TCP RELAY APPARATUS

INCORPORATION BY REFERENCE

This application claims priority based on Japanese patent application, No. 2012-102038 filed on Apr. 27, 2012, the entire contents of which are incorporated herein by reference.

BACKGROUND

The subject matter as disclosed herein relates to a transmission control protocol (TCP) relay apparatus for relaying TCP communication performed between communication devices that are connected to respective networks having different characteristics.

In recent years, cellular or mobile telecommunications systems are rapidly increasing year-by-year in the Internet-related traffic flowing therein. This results from advances in high-speed wireless communication technologies, such as radio communication networks compliant with the long term evolution (LTE) or like standards. In mobile communications systems, major characteristics of communications over wireless networks are such that these are broad in frequency band unlike wired networks and, on the other hand, are large in transfer delay, thereby posing a risk that instantaneous communication interruption occurs due to hand-over between base stations. It has been revealed that in networks of the type having such characteristics, various kinds of application programs using a default transmission control protocol/internet protocol (TCP/IP) suffer from performance deterioration, such as being unable to obtain sufficient throughputs.

Prior known performance improving schemes for suitably using the TCP in such network environments include a method for installing a TCP-terminating and relaying apparatus between a mobile phone and server and for performing default TCP transmission control between the relay apparatus and the server while performing, between the relay apparatus and the mobile phone, TCP transmission control optimized for wireless networks.

United States Patent Application Publication US 2011/0125915 A1 (referred to hereinafter as Literature 1) discloses therein a TCP transmission control device having a unit which sets up TCP transmission control information for use in a TCP connection to be established between a transmission-side terminal and its chosen reception-side terminal in compliance with the type of a network to which the reception terminal belongs. The TCP transmission control device disclosed in Literature 1 is specifically arranged to set up TCP transmission control information based on the kind of communication services and IP address routing information of the reception terminal.

By employing such an arrangement, the transmission-side device sets appropriate TCP transmission control information in accordance with a packet data communication network to which its associated opponent party's terminal belongs whereby it is possible to perform efficient TCP communication, thus making it possible to appreciably shorten a retransmission time in packet loss events. In addition, it becomes possible to set adequate TCP parameters in units of TCP connections with the use of existing architectures without having to modify the current TCP stack/protocols. By arranging the TCP relay apparatus to have its ability to perform the TCP transmission control method disclosed in Literature 1, it becomes possible to make the efficiency of TCP communications between a cell phone and server improved.

SUMMARY

The technique disclosed in Literature 1 assumes that the setting of TCP transmission control information is uniquely determinable on a per-service basis. However, it does not disclose a technique for providing precise control in units of TCP connections or the like.

Additionally, the determination of a network to which the reception-side terminal belongs is based on the routing information of IP address of such terminal. Unfortunately in ordinary mobile communications systems, the reception-side terminal is granted to have a wide variety of IP address domains. For this reason, it is a must to set a large number of IP addresses in the transmission-side terminal, causing inconveniences as to system operations.

As one of the TCP transmission control information, a minimal value of a retransmission timeout (RTO) period of TCP is disclosed. However, it is unlikely that packet losses inducing the TCP retransmission always occur due to network congestions. For example, when putting packets in an output queue existing in the IP layer of an operating system (OS), a queue overflow can take place, resulting in packets being discarded from time to time. In such case, when the minimum value of RTO period is set to a relatively large value, the retransmission from TCP layer becomes longer in interval. This poses a problem which follows: packets are hardly retransmitted regardless of the fact that the network is free from any congestion, which in turn leads to delay or "traffic jam" of a TCP connection.

To solve the above-stated problem, the disclosures herein provides a TCP relay apparatus, a first feature of which lies in having a unit capable of setting, in units of TCP connections, TCP control information adapted for the characteristics of a network, to which is connected a communication destination device.

A second feature of the TCP relay apparatus disclosed herein is that it further includes a unit for enabling an application program running on an OS to instruct the setting of the TCP control information suitable for the characteristics of a network, to which is connected a communication destination device without relying upon the OS's decision.

A third feature of the TCP relay apparatus disclosed herein is that it further includes a unit for determining or "judging" the type of the communication destination device's linked network depending upon whether a passive connection to a listen port or a TCP connection to a server device.

A fourth feature of the TCP relay apparatus is that it further includes a unit for distinguishing between packet discard due to a network congestion and packet discard due to an overflow of internal transmission queue of the OS, for setting a minimum value of TCP-RTO suitable for the network type in the case of the former, and for setting a minimum value of default TCP-RTO in the case of the latter.

Owing to the features, installing the TCP-terminating/relaying apparatus between a mobile phone and server device makes it possible to provide precise control per TCP connection in the event of performing default TCP transmission control with respect to the server and performing, for the mobile phone, TCP transmission control suitable for wireless networks.

Another advantage is that it becomes easier to determine the type of a network to which the reception-side terminal belongs.

A further advantage lies in an ability to suppress a phenomenon which follows: in case the minimum TCP-RTO value is set to a relatively large value, a longer time is consumed before packet retransmission actually gets started, resulting in deceleration of a TCP connection even when the network is free from congestions.

According to disclosures herein, it becomes possible to sustain high communication quality without regard to the type of a network being connected.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF DRAWINGS

FIG. 2 shows an exemplary structure of a socket parameter management table of the TCP relay apparatus of the first embodiment.

FIG. 3 shows an exemplary table structure of custom TCP setup of the first embodiment.

DETAILED DESCRIPTION OF THE EMBODIMENTS

Currently preferred embodiments will be described with reference to the accompanying drawings below.

Embodiment 1

Figure 1:
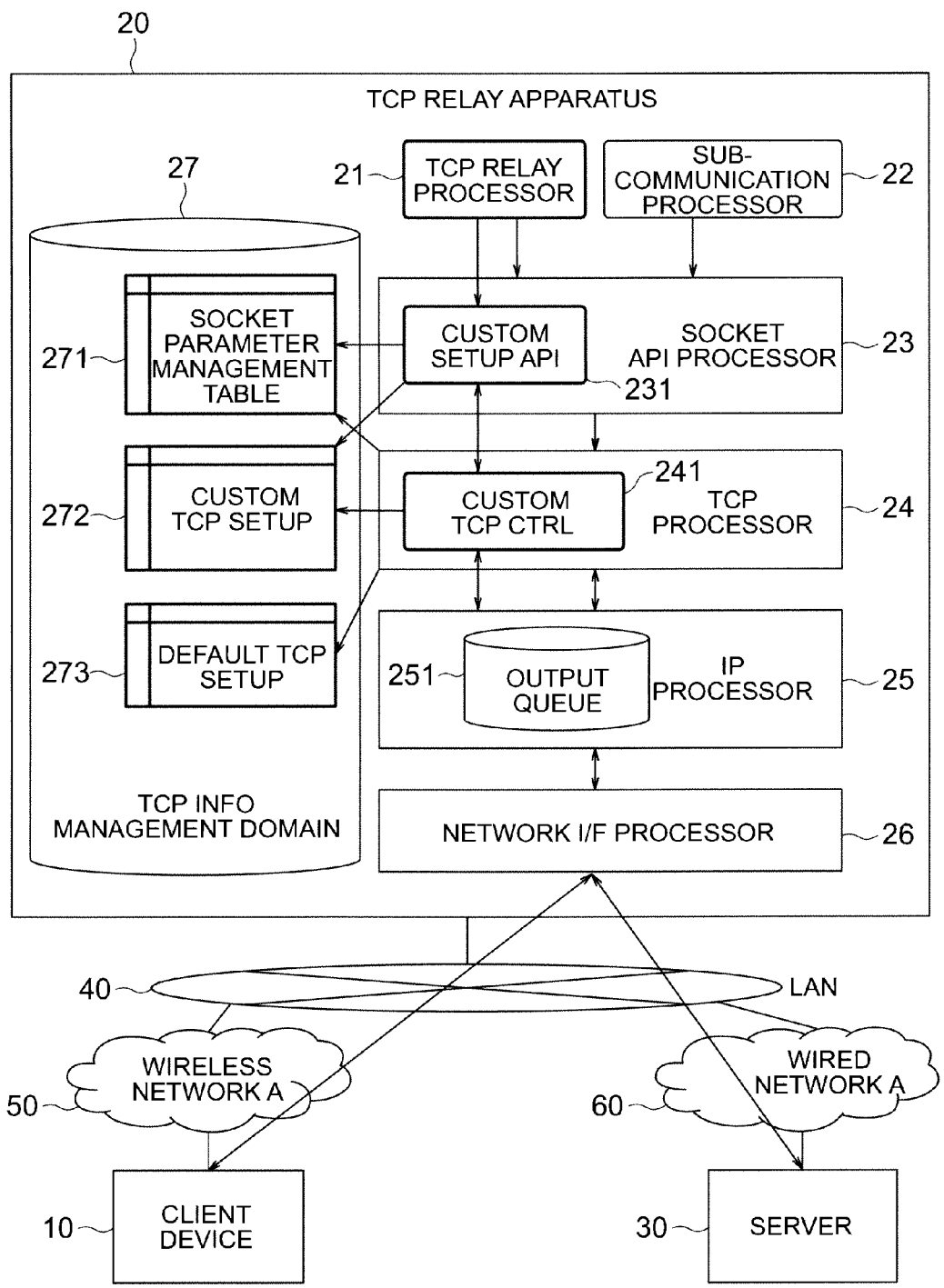
FIG. 1 is a block diagram showing an exemplary configuration of a TCP relay apparatus in accordance with a first embodiment.

FIG. 1 is a block diagram showing an exemplary configuration of a transmission control protocol (TCP) relay apparatus 20 in accordance with one embodiment.

The TCP relay apparatus 20, also called the TCP repeater in some cases, is operatively associated with a plurality of networks having different characteristics, for relaying TCP communication between communication devices that are connected to networks respectively.

The TCP relay apparatus 20 is presently in a state capable of communicating with a client device 10 through a local area network (LAN) 40 and a wireless network "A" 50.

The client device 10 uses a protocol on transmission control protocol/internet protocol (TCP/IP), such as hypertext transfer protocol (HTTP), to establish a connection to a server device 30, thereby performing service request.

The TCP relay apparatus 20 is also in a state capable of communicating with the server device 30 via the LAN 40 and a wired communication network "A" 60.

The server device 30 is a device on which a server process operates for providing Web services or else to the client device 10.

Figure 8:
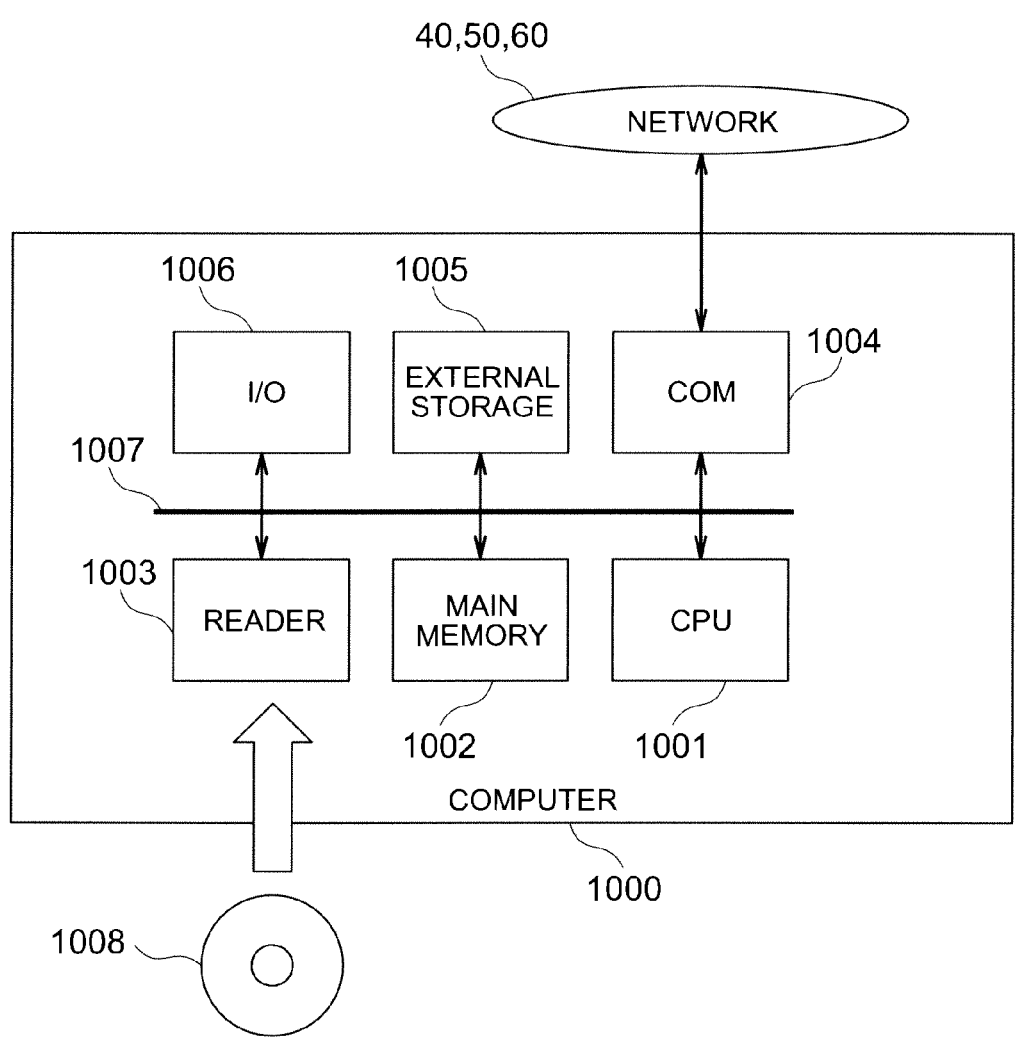
FIG. 8 shows an exemplary hardware configuration of a general-purpose computer for use as a client device, server device or TCP relay apparatus in the embodiment.

A hardware configuration example of each of the client device 10, TCP relay apparatus 20 and server device 30 is shown in FIG. 8.

Each of these devices is implementable by a general-purpose computer 1000, which is made up of a central processing unit (CPU) 1001, a main storage unit 1002, typically, a semiconductor memory, an external storage device 1005 such as hard-disk drive (HDD), a data readout device 1003 which reads data out of a removable and carriageable record media 1008 such as compact disc read-only memory (CD-ROM), digital versatile disc (DVD) or else, an input/output device 1006 such as a display monitor, keyboard with or without a pointing device called the mouse, a communication device 1004 used for connection with a network 1010, such as network interface card (NIC) or else, and a bundle of internal data transfer lines, such as buses for interconnection between respective devices.

For example, a TCP information management region or "domain" 27 to be later described is realized by use of a partial storage space of the main memory 1002. Each device loads one of various kinds of software programs being stored in its associated external storage device 1005 into main storage device 1002 for execution of the loaded program by CPU 1001 and makes a connection with network 1010 using communication device 1004 to perform network communication with client device 10 and server device 30, thereby achieving various functions of respective processing units in this embodiment along with processing to be executed thereby.

As shown in FIG. 1, the TCP relay apparatus 20 includes a TCP relay processing unit 21, subordinate communication processing unit 22, socket API processing unit 23, TCP processing unit 24, IP processing unit 25, network interface processing unit 26 and TCP information management domain 27.

The TCP processor unit 21 performs main processing of termination and relay/interexchange of TCP communication between the client device 10 and server device 30. The sub-communication processor unit 22 performs communication-related processing other than the TCP relaying operation, including middleware processing such as monitoring or "surveillance" of an operating state of TCP relay apparatus 20 as an example. Note that the sub-communication processor 22 does not communicate directly with the device 10 and server device 30.

The socket API processor unit 23 provides the TCP processor 21 and sub-communication processor 22 with an application programming interface (API) for connection establishment and data transmission/reception in the form of a "socket," which is an abstractly created concept of TCP communication.

The socket API processor 23 has a custom setup API 1231. This API is for performing registration, referencing, alteration and deletion of a custom TCP setup 272 as will be discussed later in the description.

The TCP relay processor 21 performs communication (data transmission/reception) with the client device 10 and server device 30 by calling the API of socket API processor 23.

The TCP processor 24 performs TCP connection and data transfer/reception control. The IP processor 25 performs processing of the IP layer of TCP/IP.

The IP processor 25 internally has an output queue 251 and performs, upon transmission of a stream of IP packets to a network interface processing unit 26 to be later described, the queuing of IP packets until such transmission is completed.

The network interface processor 26 is for control of a network interface device that sends and receives data to and from the LAN 40.

The TCP information management domain 27 is a storage region for storing therein data or information used for TCP management and control. TCP information management domain 27 has therein a default TCP setup 273 storing therein default TCP setup information.

The TCP information management domain 27 also has a socket parameter management table 271 and custom TCP setup 272.

A detailed explanation will here be given of the socket parameter management table 271 with reference to FIG. 2.

The socket parameter management table 271 has, as socket setup data, a socket descriptor field 2711, classification field 2712, minimum retransmission timeout (RTO) value field 2713, maximum RTO value field 2714 and initial window size field 2715.

The socket descriptor field 2711 is a region for storage of identifiers of sockets created by the TCP relay processor unit 21.

The classification field 2712 is a region for storage of network types, such as "wireless network," "wired network," etc.

The minimum RTO value field 2713 is a region for storage of a minimum value (synonymous with a lower limit value) of RTO period.

The maximum RTO value field 2714 is a region for storage of a maximum (i.e., upper limit) value of RTO period.

The initial window size field 2715 is a region for storage of a value indicative of an initial size of TCP congestion window.

The information of socket parameter management table 271 is subjected to registration, alteration or deletion by the socket API processor 23 and TCP processor 24.

A detailed explanation will next be given, using FIG. 3, of the custom TCP setup 272.

The custom TCP setup 272 has a classification field 2721, minimum RTO value field 2722, maximum RTO value field 2733 and initial window size field 2724.

The classification field 2721 is a region for storage of network types, such as "wireless network," "wired network," etc.

The minimum RTO value field 2722 is a region for storage of a minimum value (i.e., lower limit value) of RTO period.

The maximum RTO value field 2733 is a region for storage of a maximum (upper limit) value of RTO period.

The initial window size field 2724 is a region for storage of a value indicating an initial window size.

The information of custom TCP setup 272 undergoes registration, alteration or deletion to be performed by the custom setup API 1231 and a custom TCP control unit 241.

An operation—say, TCP packet relaying process—of the TCP relay apparatus 20 of the embodiment 1 will be described with reference to FIGS. 4 through 7 below.

Figure 4:
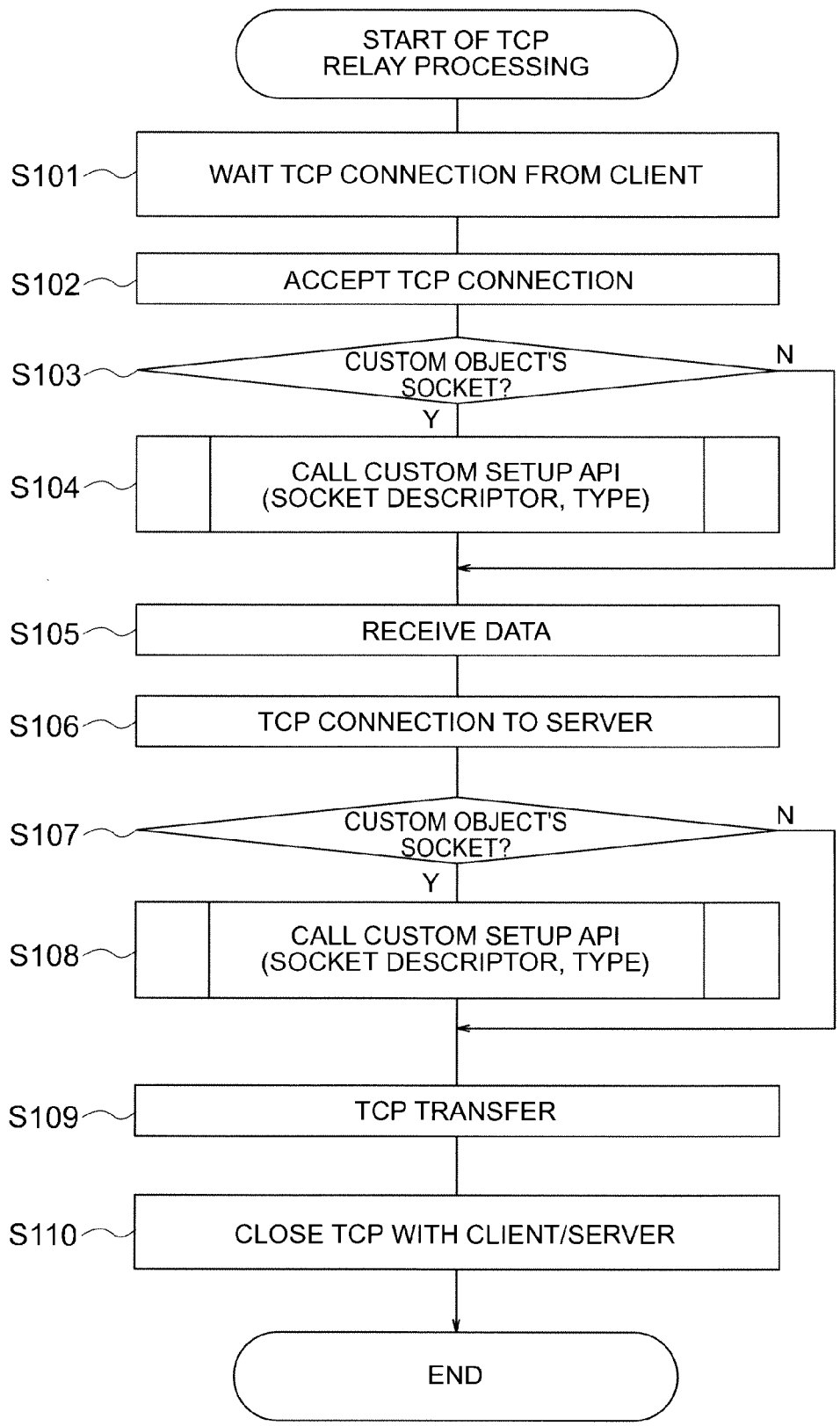
FIG. 4 is a flow diagram of TCP relay processing of the TCP relay apparatus of the first embodiment.

FIG. 4 is a flowchart of one exemplary TCP relay processing to be executed by the TCP relay processor unit 21.

Firstly, the TCP relay processor 21 awaits a TCP connection from the client device 10 at a listen port (in step S101).

If there is a TCP connection, then accept this TCP connection (at step S102).

A decision is made as to whether or not this TCP connection is a custom target object (at step S103). If "Yes," call the custom setup API 1231 and then pass thereto a socket descriptor and network type information (step S104).

The determination as to whether the accepted connection is a custom object may be carried out, for example, based on judging the inbound TCP connection is which one of a connection to a specific listen port number in the TCP relay apparatus 20 from the client device 10 and a connection to a specific listen port number from the TCP relay apparatus 20 to server device 30. A practical example of such process is as follows. The TCP relay apparatus 20 reads, upon its start-up, a setup file which was prestored by a system administrator in TCP relay apparatus 20 and which has a description indicating "TCP listen port No. 8080 is assigned to wireless network A, and port #8081 is allocated to wired network A," and operates in conformity with the following judgment conditions: "TCP connection to the listen port #8080 is a wireless network A" and "TCP connection to listen port #8081 is a wired network A."

If "No" at step S103, then the process proceeds to step S105 which receives data from the client device 10 (step S105).

In accordance with the content of the data received, TCP connection is established with respect to the server device 30 (at step S106).

A decision is made to specify whether this TCP connection is a custom object (at step S107). If Yes, call the custom setup API 1231; then, pass a socket descriptor and network type information (step S108). A determination method of the custom object is the same as that in step S104.

If No at step S107, the process goes to step S109 which relays TCP data between the client device 10 and server device 30.

Upon completion of the relaying operation, the process goes next to step S110 which breaks the TCP connection with the client device 10 and server device 30, followed by exiting the TCP relay processing.

Figure 5:
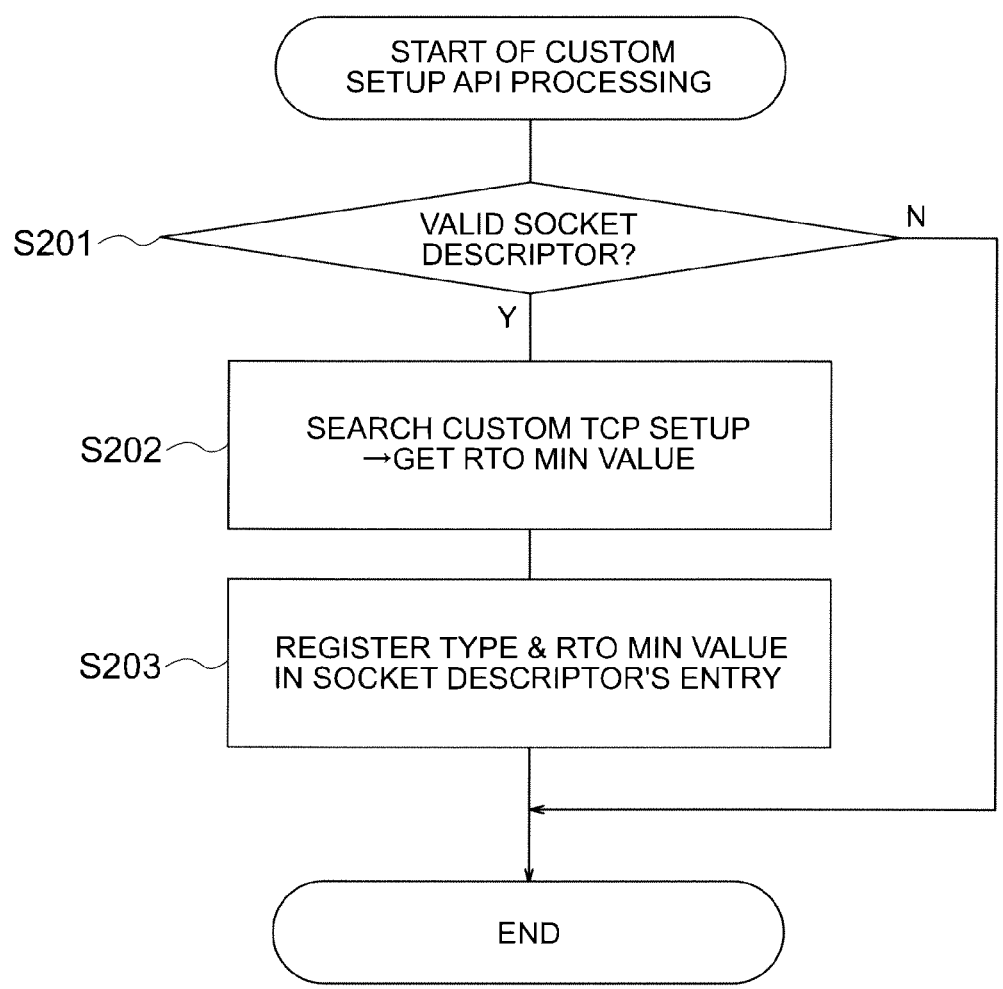
FIG. 5 is a flow chart of custom setup application program interface (API) processing of the TCP relay apparatus of the first embodiment.

See FIG. 5, which is a flowchart of exemplary custom setup API processing to be performed using the custom setup API 1231.

The custom setup API 1231 is responsive to receipt of a call from the TCP relay processor 21, for starting its operation to confirm whether the socket descriptor passed thereto is a valid socket descriptor (at step S201).

If Yes then a search is conducted to find a custom TCP setup 272 with the network type being as a search key, resulting in acquisition of information on the minimum RTO value 2722 from an entry searched (step S202).

Further, the classification information indicative of the network type and minimum RTO value 2722 are registered into an entry of the socket descriptor of the socket parameter management table 271.

If No at step S201, the processing is terminated immediately.

The processing at step S202 may be modified to perform a process which includes conducting a search for custom TCP setup 272 with the network type being as a search key to thereby acquire the information of maximum RTO value 2723 from an entry searched, and registering the type data and maximum RTO value 2723 in an entry of the socket descriptor of socket parameter management table 271.

Alternatively, the processing of step S202 may be modified to perform a process including conducting a search for custom TCP setup 272 with the type as a search key to thereby obtain the information of initial window size 2724 from an entry searched, and registering the type data and the value of such initial window size 2724 in an entry of the socket descriptor of socket parameter management table 271.

Still alternatively, the processing of step S202 may be modified so that the information to be acquired from the custom TCP setup 272 and the information to be registered in the entry of the socket descriptor of socket parameter management table 271 may be any possible combinations of the minimum RTO value 2722, maximum RTO value 2733 and initial window size 2724 or all of them.

Figure 6:
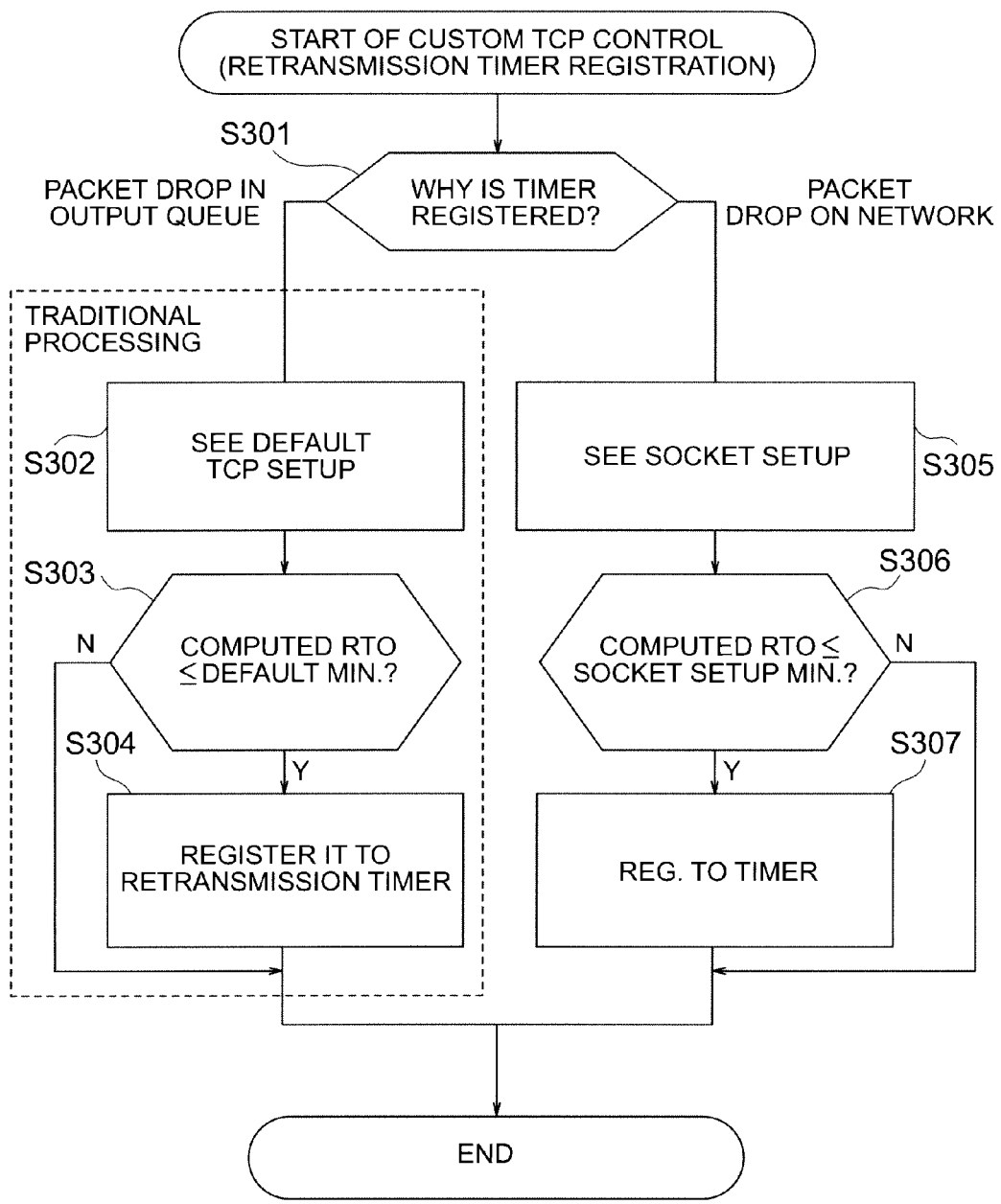
FIG. 6 is a flowchart of custom TCP control processing of the TCP relay apparatus of the first embodiment.

FIG. 6 is a flowchart of exemplary retransmission timer registration processing, which is part of the custom TCP control processing executed by the custom TCP control unit 241.

First, the custom TCP controller 241 checks a registration reason of retransmission timer (at step S301).

If the registration reason is packet discard at output queue in the IP processor 25, traditional processing is performed, which references the default TCP setup 273 and acquires a default minimum RTO value (at step S302).

Then, checking is done to determine whether an RTO value that was calculated from a round trip time (RTT) of the TCP is less than or equal to the default minimum RTO value 20 (step S303). Note here that in a request for comments (RFC) 2988, one example of a method for calculating RTO value from RTT is shown.

If Yes at step S303, then the procedure goes to step S304 which registers the default minimum RTO value in the retransmission timer as RTO value. If No then the currently executed processing is ended instantly.

In case the examination at step S301 reveals that the registration reason is packet discard occurring over the network, access is given to the socket setup information from socket parameter management table 271 with the socket descriptor as a search key (step S305).

Then, an RTO value that was computed from the TCP's RTT is compared with the minimum RTO value obtained from the socket setup information to thereby check whether the former is less than or equal to the latter (step S306).

If Yes at step S306, then register the minimum RTO value of socket setup information in the retransmission timer as RTO value (step S307). If No then quit the processing promptly.

The processing at any one of the steps S302-S304 and S306-S307 may be modified to use the maximum RTO value rather than the minimum RTO value or, alternatively, use both of these minimum and maximum RTO values.

An example is that in the case of using the maximum RTO value, the step S302 may be arranged to obtain default minimum RTO value by reference to the default TCP setup 273.

Additionally, the step S303 may be altered to check whether an RTO value computed from the TCP's RTT is greater than or equal to the default maximum RTO value. If Yes, then register such default maximum RTO value in the retransmission timer as RTO value (step S304). If No then quit the processing instantly.

Optionally, the step S306 may be modified to check whether an RTO value computed from the TCP's RTT is larger than or equal to the maximum RTO value obtained from the socket setup information: if Yes, then register the maximum RTO value of socket setup information in the retransmission timer as RTO value (step S307); if No then exit the processing.

Embodiment 2

Figure 7:
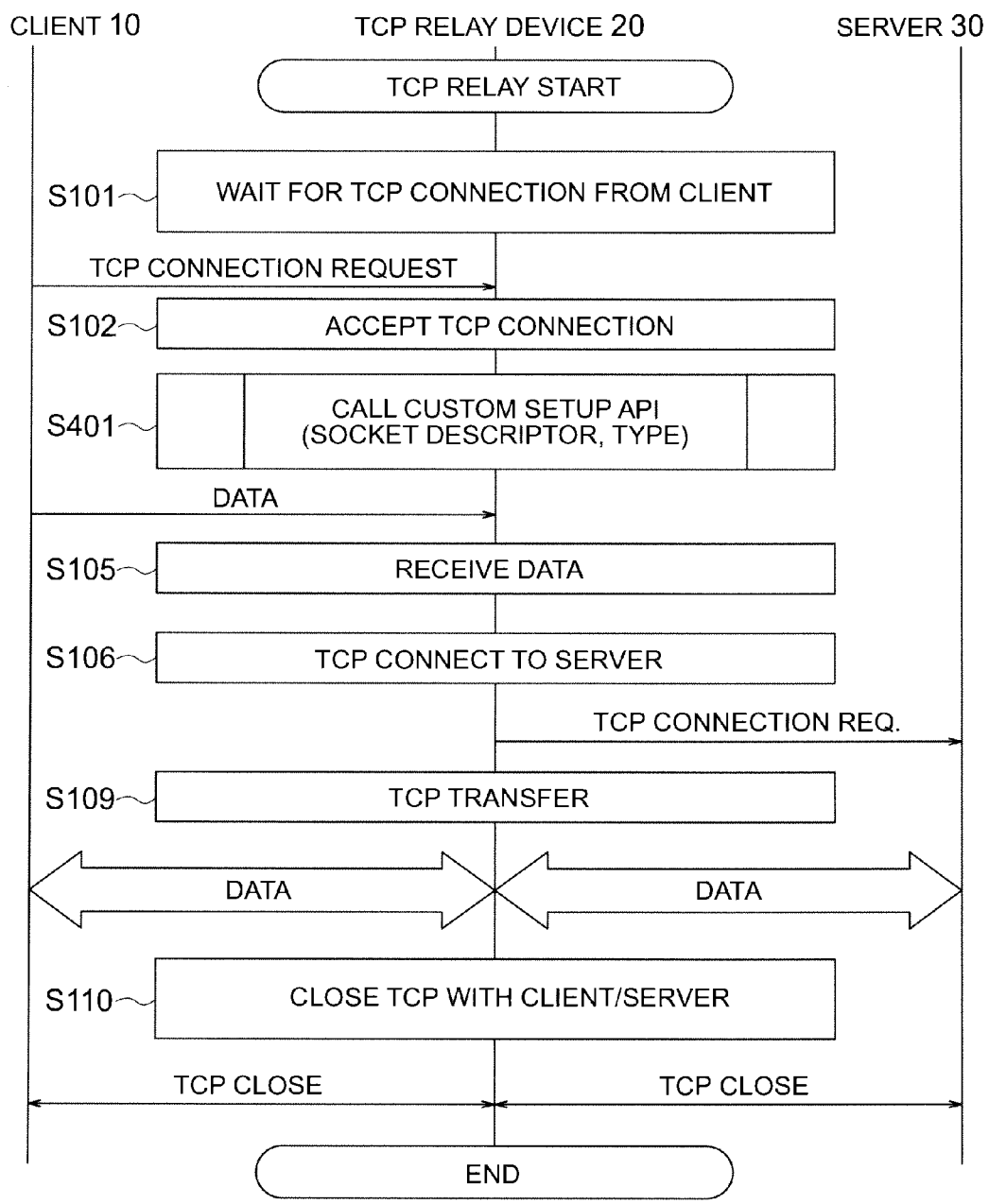
FIG. 7 shows an exemplary TCP relay processing sequence of a TCP relay apparatus of a second embodiment.

FIG. 7 is a sequence diagram showing one example of the TCP relay processing. The sequence as shown herein is in a case where a TCP connection to the listen port is judged to be a custom object in the processing of step S103. Steps S101-S102 are the same as those of FIG. 4.

As the TCP connection to listen port is qualified as a custom object, a need arises to perform additional processing, i.e., calling of the custom setup API (at step S401).

Data is received from the device 10 (step S105).

A TCP connection to the server device 30 is established in accordance with the content of such received data (step S106).

Processing is performed to relay TCP packet data between the client device 10 and server device 30 (step S109).

Upon completion of such relay processing, the TCP connection with the client device 10 and server device 30 is closed, i.e., cut off (step S110); then, quit the TCP relay processing.

As apparent from the foregoing, in the illustrative embodiment, it is possible by installing the TCP-terminating/relaying apparatus between a mobile phone and server to provide precise control on a per-TCP connection basis in the process of performing default TCP transmission control with respect to the server and performing, for the mobile phone, TCP transmission control suitable for wireless networks. It is also possible to make easier the determination or "judgment" of a network to which the reception-side terminal belongs. Furthermore, it is possible to suppress or minimize a phenomenon which follows: in case the minimum TCP RTO value is set to a relatively large value, a long time is undesirably consumed before packet retransmission actually gets started, resulting in deceleration of a TCP connection even when the network is free from any congestion.

Each of the embodiments shown-above has been described as one example. Various modifications and applications may occur without being limited to disclosures herein.

Although the present disclosure has been described with reference to example embodiments, those skilled in the art will recognize that various changes and modifications may be made in form and detail without departing from the spirit and scope of the claimed subject matter.

We claim:

1. A transmission control protocol (TCP) relay apparatus for relaying TCP communication performed between a client device and a server device which are linked to respective networks having different characteristics, the apparatus comprising:
   a TCP processing unit for performing TCP connection and data transmission/reception control;
   a network interface processing unit for controlling a network interface device which performs data transmission/reception with respect to a network;
   an internet protocol (IP) processing unit for performing IP layer processing, for having therein an output queue and for performing, upon transmission of IP packets to the network interface processing unit, IP packet queuing until completion of the transmission;
   a TCP relay processing unit for performing termination and relay processing of TCP communication between the client device and the server device;
   a socket application programming interface (API) processing unit for providing the TCP processing unit with an API used for connection establishment and/or data transmission/reception; and
   a TCP information management region for use in storage of information used for TCP management and control, including a default TCP set-up storing therein default TCP set-up information, wherein
   the TCP information management region has a socket parameter management table and a custom TCP set-up,
   the socket parameter management table includes, as socket setup information, a socket descriptor filed "A", a classification field A, a minimum retransmission timeout (RTO) period value field A, a maximum RTO period value field A, and an initial window size field A, the socket descriptor field A is a region for storage of a socket identifier created by the TCP relay processing unit, the classification field A is a region for storage of a network type or types, the minimum RTO period value filed A is a region for storage of a minimum value (lower limit value) of RTO period, the maximum RTO period value field A is a region for storage of a maximum value (upper limit value) of RTO period, the initial window size field A is a region for storage of an initial window size value, the custom TCP setup includes a classification field "B", a minimum RTO period value field B, a maximum RTO period value field B and an initial window size filed B, the classification field B is a region for storage of network types, the minimum RTO period value field B is a region for storage of a minimum value (lower limit value) of RTO period, the maximum RTO period value filed B is a region for storage of a maximum value (upper limit value) of RTO period, and a unit for setting, in units of TCP connections, TCP control information suitable for the characteristics of the networks being linked with the client device and the server device respectively.

2. The TCP relay apparatus according to claim 1, wherein the TCP relay apparatus executes processing comprising the steps of:

upon receipt of a TCP connection from the client device at a listen port, determining whether the TCP connection is a custom object;

when the TCP connection is custom object, searching the custom TCP setup while using as a search key the type of a network to which the client device at a TCP connection destinations belongs, thereby obtaining information of the custom TCP setup from an entry matched by the search;

upon execution of TCP connection with the server device, determining whether the TCP connection is a custom object;

when the TCP connection is custom object, searching the custom TCP setup while using a search key the type of the network to which the server device at a TCP connection destination belongs, thereby acquiring information of the custom TCP setup from an entry matched by the search; and registering network type information and the custom TCP setup information to an entry indicating the TCP setup of the socket parameter management table.

3. The TCP relay apparatus according to claim 2, wherein the socket API processing unit accepts a setting of TCP control information which is instructed by an application running on an operating system (OS) and which is suitable for the type of the network linked with the client device and/or the server device.

4. The TCP relay apparatus according to claim 3, wherein the socket API processing unit has a custom setup API which is for execution of any one of registration, referencing, alteration and deletion with respect to the custom TCP setup and which is suitable for the type of the network to which a respective one of the client device and the server device is connected, and wherein the TCP relay processing unit executes processing comprising the steps of:

upon receipt of a TCP connection from the client device at a listen port, when the TCP connection is a custom object, calling the custom setup API and passing a socket descriptor and classification information thereto as API arguments; and upon execution of TCP connection to the server device, when the TCP connection is a custom object, calling the custom setup API and passing a socket descriptor and classification information thereto as API arguments.

5. The TCP relay apparatus according to claim 1, further comprising:

a unit for distinguishing packet discard due to a network congestion from packet discard due to a transmission queue overflow within an OS, for setting a minimum value of TCP RTO suitable for the network type in a case of the former, and for setting a minimum value of default TCP RTO value in a case of the latter.

6. The TCP relay apparatus according to claim 5, wherein the TCP processing unit performs processing comprising the steps of:

checking a registration reason of a retransmission timer;

if the retransmission timer registration reason is packet discard at the output queue in the IP processing unit, acquiring a minimum value of default RTO period with reference to the default TCP setup;

checking whether an RTO period value computed from a round trip time (RTT) of the TCP is less than or equal to the default minimum RTO period value;

if Yes, registering the default minimum RTO period value to the retransmission timer as an RTO period value;

if No, ending the processing;

if the retransmission timer registration reason is in-network packet discard, referencing the socket setup information from the socket parameter management table with the socket descriptor being as a search key;

checking whether an RTO period value computed from the RTT of TCP is less than or equal to the minimum RTO period value obtained from the socket setup information;

if Yes, registering the minimum RTO period value obtained from the socket setup information to the retransmission timer as an RTO period value; and if No, ending the processing.

7. The TCP relay apparatus according to claim 1, further comprising:

a unit for distinguishing packet discard due to a network congestion from packet discard due to a transmission queue overflow within an OS, for setting a maximum value of TCP RTO suitable for the network type in a case of the former, and for setting a default maximum TCP RTO value in a case of the latter.

8. The TCP relay apparatus according to claim 7, wherein the TCP processing unit performs processing comprising the steps of:

checking a registration reason of a retransmission timer;

if the retransmission timer registration reason is packet discard at the output queue in the IP processing unit, acquiring a maximum value of default RTO period with reference to the default TCP setup;

checking whether an RTO period value computed from an RTT of the TCP is greater than or equal to the default maximum RTO period value;

if Yes, registering the default maximum RTO period value to the retransmission timer as an RTO period value;

if No, ending the processing;

if the retransmission timer registration reason is in-network packet discard, referencing the socket setup information from the socket parameter management table with the socket descriptor being as a search key;

checking whether an RTO period value calculated from the RTT of TCP is more than or equal to the maximum RTO period value obtained from the socket setup information;

if Yes, registering the maximum RTO period value obtained from the socket setup information to the retransmission timer as an RTO period value; and if No, ending the processing.

9. The TCP relay apparatus according to claim 2, wherein the step of determining, upon receipt of a TCP connection from the client device at the listen port, whether the TCP connection is a custom object includes determining the type of the network linked with the client device depending upon whether or not the TCP connection is a connection to a specific listen port number of from the client device to the server device, and wherein the step of determining whether the TCP connection is a custom object upon execution of TCP connection to the server device includes determining the type of the network linked with the server device depending upon whether or not the TCP connection is a connection to a specific port number of from the TCP relay apparatus to the server device.

10. The TCP relay apparatus according to claim 2, wherein the custom TCP setup information includes at least one of a minimum value of RTO period, a maximum value of RTO period and an initial window size or any possible combinations thereof.

11. A method used in a transmission control protocol (TCP) relay apparatus for relaying TCP communication performed between a client device and a server device which are linked to respective networks having different characteristics, the apparatus including a TCP processing unit for performing TCP connection and data transmission/reception control, a network interface processing unit for controlling a network interface device which performs data transmission/reception with respect to a network, an internet protocol (IP) processing unit for performing IP layer processing, for having therein an output queue and for performing, upon transmission of IP packets to the network interface processing unit, IP packet queuing until completion of the transmissions, a TCP relay processing unit for performing termination and relay processing for TCP communication between the client device and the server device, a socket application programming interface (API) processing unit for providing the TCP processing unit with an API used for connection establishment and/or data transmission/reception, and a TCP information management region for use in storage of information used for TCP management and control, including a default TCP set-up storing therein default TCP set-up information;

wherein the TCP information management region has a socket parameter management table and a custom TCP setup, the socket parameter management table includes, as socket set-up information, a socket descriptor field "A," a classification field A, a minimum retransmission timeout (RTO) period value field A, a maximum RTO period value field A and an initial window size field A, the socket descriptor field A is a region for storage of a socket identifier created by the TCP relay processing unit, the classification field A is a region for storage of a network type or types, the minimum RTO period value filed A is a region for storage of a minimum value (lower limit value) of RTO period, The maximum RTO period value field A is a region for storage of a maximum value (upper limit value) of RTO period, The initial window size field A is a region for storage of an initial window size value, the custom TCP setup includes a classification field "B", a minimum RTO period value field B, a maximum RTO period value field B and an initial window size filed B, the classification field B is a region for storage of network types, the minimum RTO period value field B is a region for storage of a minimum value (lower limit value) of RTO period, the maximum RTO period value filed B is a region for storage of a maximum value (upper limit value) of RTO period, and the initial window size field B is a region for storage of an initial window size value, and a unit for setting, in units of TCP connections, TCP control information suitable for the characteristic of the networks being linked with the client device and the server device respectively, the method comprises the steps of, at the TCP relay processing unit:

determining whether the TCP connection is a custom object, upon receipt of a TCP connection from the client device at a listen port;

searching the custom TCP setup while using as a search key the type of a network to which the client device at a TCP connection destination belongs;

when the TCP connection is custom object, thereby obtaining information of the custom TCP setup from an entry matched by the search;

determining whether the TCP connection is a custom object, upon execution of TCP connection with the server device;

searching the custom TCP setup while using as a search key the type of the network to which the server device at a TCP connection destination belongs, when the TCP connection is custom object, thereby acquiring information of the custom TCP setup from an entry matched by the search; and registering network type information and the custom TCP setup information to an entry indicating the TCP setup of the socket parameter management table.

12. The method according to claim 11, wherein the socket API processing unit accepts a setting of TCP control information which is instructed by an application running on an operating system (OS) and which is suitable for the type of the network linked with the client device and/or the server device.

13. The method according to claim 12, wherein the socket API processing unit has a custom setup API which is for execution of any one of registration, referencing, alteration and deletion with respect to the custom TCP setup and which is suitable for the type of the network to which a respective one of the client device and the server device is connected, and wherein the TCP relay processing unit executes processing comprising the steps of:

upon receipt of a TCP connection from the client device at a listen port, when the TCP connection is a custom object, calling the custom setup API and passing a socket descriptor and classification information thereto as API arguments; and upon execution of TCP connection to the server device, when the TCP connection is a custom object, calling the custom setup API and passing a socket descriptor and classification information thereto as API arguments.

14. The method according to claim 11, further comprising:
a unit for distinguishing packet discard due to a network congestion from packet discard due to a transmission queue overflow within an OS, for setting a minimum value of TCP RTO suitable for the network type in a case of the former, and for setting a minimum value of default TCP RTO value in a case of the latter.

15. The method according to claim 14, wherein the TCP processing unit performs processing comprising the steps of:
checking a registration reason of a retransmission timer;
if the retransmission timer registration reason is packet discard at the output queue in the IP processing unit, acquiring a minimum value of default RTO period with reference to the default TCP setup;
checking whether an RTO period value computed from a round trip time (RTT) of the TCP is less than or equal to the default minimum RTO period value;
if Yes, registering the default minimum RTO period value to the retransmission timer as an RTO period value;
if No, ending the processing;
if the retransmission timer registration reason is in-network packet discard, referencing the socket setup information from the socket parameter management table with the socket descriptor being as a search key;
checking whether an RTO period value computed from the RTT of TCP is less than or equal to the minimum RTO period value obtained from the socket setup information;
if Yes, registering the minimum RTO period value obtained from the socket setup information to the retransmission timer as an RTO period value; and
if No, ending the processing.

16. The method according to claim 11, further comprising:
a unit for distinguishing packet discard due to a network congestion from packet discard due to a transmission queue overflow within an OS, for setting a maximum value of TCP RTO suitable for the network type in a case of the former, and for setting a default maximum TCP RTO value in a case of the latter.

17. The method according to claim 16, wherein the TCP processing unit performs processing comprising the steps of:
checking a registration reason of a retransmission timer;
if the retransmission timer registration reason is packet discard at the output queue in the IP processing unit, acquiring a maximum value of default RTO period with reference to the default TCP setup;
checking whether an RTO period value computed from an RTT of the TCP is greater than or equal to the default maximum RTO period value;
if Yes, registering the default maximum RTO period value to the retransmission timer as an RTO period value;
if No, ending the processing;
if the retransmission timer registration reason is in-network packet discard, referencing the socket setup information from the socket parameter management table with the socket descriptor being as a search key;
checking whether an RTO period value calculated from the RTT of TCP is more than or equal to the maximum RTO period value obtained from the socket setup information;
if Yes, registering the maximum RTO period value obtained from the socket setup information to the retransmission timer as an RTO period value; and
if No, ending the processing.

18. The method according to claim 11, wherein the step of determining, upon receipt of a TCP connection from the client device at the listen port, whether the TCP connection is a custom object includes determining the type of the network linked with the client device depending upon whether or not the TCP connection is a connection to a specific listen port number of from the client device to the server device, and wherein
the step of determining whether the TCP connection is a custom object upon execution of TCP connection to the server device includes determining the type of the network linked with the server device depending upon whether or not the TCP connection is a connection to a specific port number of from the TCP relay apparatus to the server device.

19. The method according to claim 11, wherein the custom TCP setup information includes at least one of a minimum value of RTO period, a maximum value of RTO period and an initial window size or any possible combinations thereof.

* * * * *